US012783712B2

(12) United States Patent
Zhou et al.

(10) Patent No.: US 12,783,712 B2
(45) Date of Patent: Nov. 3, 2026

(54) MIXED CACHE RETRIEVAL APPROACH FOR IDENTITY LOCAL AUTHORIZATION CLIENT

(71) Applicant: Oracle International Corporation, Redwood Shores, CA (US)

(72) Inventors: Pengcheng Zhou, Seattle, WA (US); Thomas James Andrews, Seattle, WA (US); Srinivasa Aditya Uppu, Bothell, WA (US); Mingxiao Luo, Lynwood, WA (US)

(73) Assignee: Oracle International Corporation, Redwood Shores (CA)

( * ) Notice: Subject to any disclaimer, the term of this patent is extended or adjusted under 35 U.S.C. 154(b) by 51 days.

(21) Appl. No.: 18/758,084

(22) Filed: Jun. 28, 2024

(65) Prior Publication Data

US 2025/0278509 A1 Sep. 4, 2025

Related U.S. Application Data

(60) Provisional application No. 63/559,722, filed on Feb. 29, 2024.

(51) Int. Cl.
*G06F 21/62* (2013.01)
*G06F 16/172* (2019.01)

(52) U.S. Cl.
CPC ........ *G06F 21/6227* (2013.01); *G06F 16/172* (2019.01)

(58) Field of Classification Search
None
See application file for complete search history.

(56) References Cited

U.S. PATENT DOCUMENTS

2008/0205396 A1* 8/2008 Dakshinamoorthy ........................ H04L 12/1886 370/390
2015/0306504 A1* 10/2015 Motarwar ............. A63F 13/795 463/29
2018/0253482 A1* 9/2018 Sato .................... G06F 12/0875
2024/0127240 A1* 4/2024 Abraham ............. G06Q 20/102
2024/0214214 A1* 6/2024 Chu .......................... H04L 9/50

* cited by examiner

*Primary Examiner* — Sanchit K Sarker
(74) *Attorney, Agent, or Firm* — Kilpatrick Townsend & Stockton

(57) ABSTRACT

Techniques are described for evaluating an authorization request on a local computer system. An example technique can include a system, receiving an authorization request from a user device. The system can determine that authorization data, stored in a cache, does not comply with a timing threshold. In accordance with the determination that they authorization data stored in the cache does not comply with the timing threshold, the system can request updated authorization data corresponding to the authorization data that does not comply with the timing threshold. The system can determine a timing for the request. The system can implement a lock configured to block subsequent requests for the updated data. The system can execute the request for the updated authorization data according to the timing. The system can store the updated authorization data in the cache.

16 Claims, 9 Drawing Sheets

MIXED CACHE RETRIEVAL APPROACH FOR IDENTITY LOCAL AUTHORIZATION CLIENT

CROSS-REFERENCES TO RELATED APPLICATIONS

This application claims the benefit of and priority to U.S. Provisional Application No. 63/559,722, filed on Feb. 29, 2024, which is incorporated herein by reference in its entirety.

BACKGROUND

The adoption of cloud services has seen a rapid uptick in recent times. Various types of cloud services are now provided by different cloud service providers (CSPs). The term cloud service is generally used to refer to a service or functionality that is made available by a CSP to subscribing customers on demand, typically using a subscription model, using systems and infrastructure (commonly referred to as cloud infrastructure) provided by the CSP. Typically, the servers and systems included in the CSP-provided cloud infrastructure that are used to provide a cloud service to a subscribing customer, are separate from the customer's own on-premises servers and systems. The CSP-provided infrastructure can include compute, storage, and networking resources. Customers can thus avail themselves of cloud services provided by the CSP without having to purchase their own hardware and software resources for the services. Cloud services are designed to provide a subscribing customer easy, scalable, and on-demand access to applications and computing resources without the customer having to invest in procuring the infrastructure for providing the services or functions. Various types or models of cloud services may be offered such as Software-as-a-Service (SaaS), Platform-as-a-Service (PaaS), Infrastructure-as-a-Service (IaaS), and others. A customer can subscribe to one or more cloud services provided by a CSP. The customer can be any entity such as an individual, an organization, an enterprise, or the like.

Different services offered by a CSP may have different authorization processes and different permissions. In some instances, these different authorization processes and permissions can result in an unsatisfactory customer experience. Accordingly, further improvements are desired.

BRIEF SUMMARY

Embodiments described herein are directed towards techniques and devices for local evaluation of authorization requests and operations for maintaining updated cache data for locally evaluating the authorization requests. An example technique can include a method. The method can include a computer system receiving an authorization request from a user device.

The method can further include determining whether authorization data, stored in a cache of the computer, complies with a timing threshold.

The method can further include, in accordance with a determination that the authorization data stored in the cache does not comply with the timing threshold, requesting updated authorization data corresponding to the authorization data that does not comply with the timing threshold.

The method can further include determining a timing for the request for retrieving the updated authorization data from a metadata store.

The method can further include implementing a lock configured to block subsequent requests for the updated authorization data.

The method can further include executing the request for the updated authorization data according to the timing threshold.

DETAILED DESCRIPTION

Figure 1:
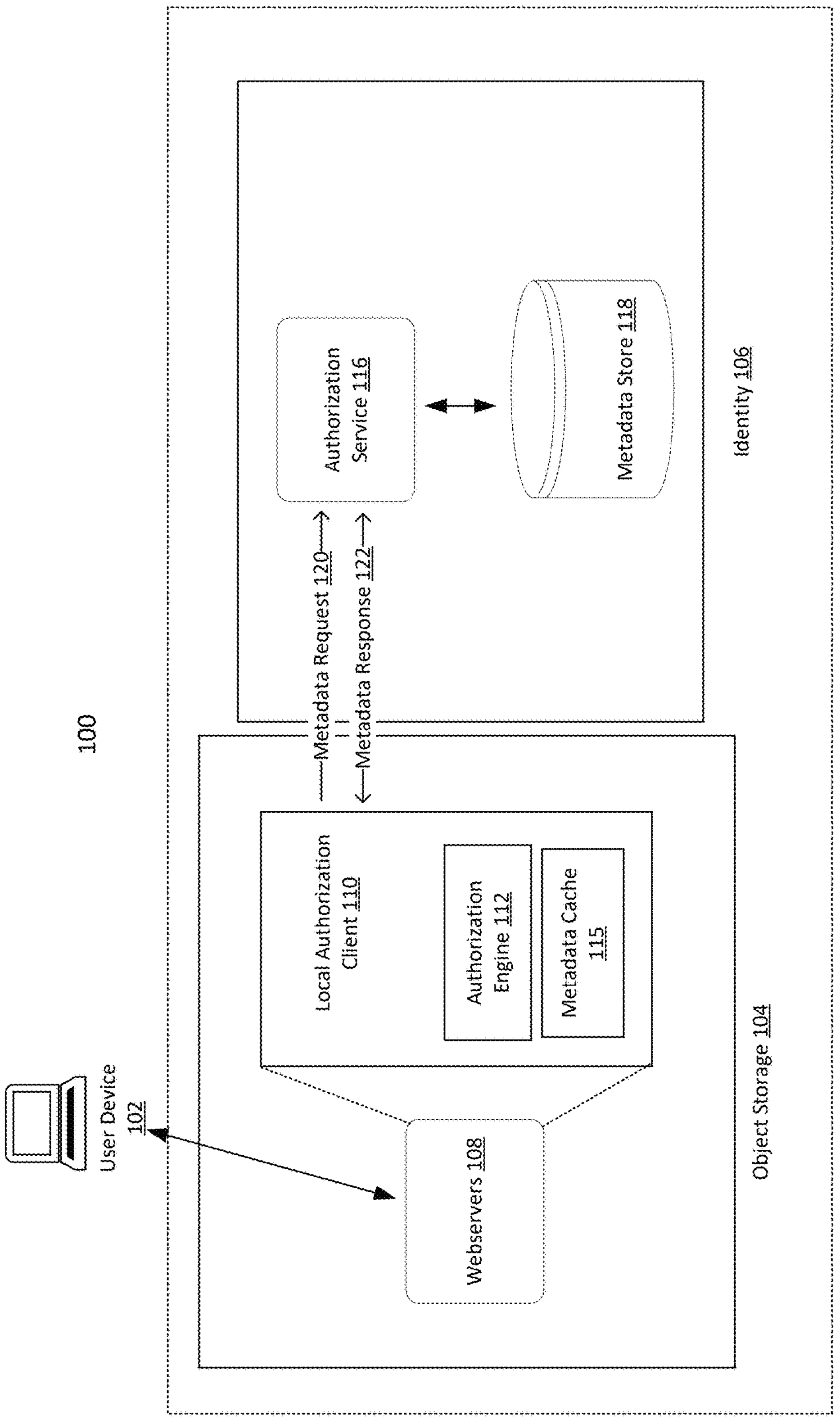
FIG. 1 is a schematic illustration of a system for cache retrieval approach for authorization at a local authorization client, according to some embodiments.

In the following description, for the purposes of explanation, specific details are set forth to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates generally to cloud computing, and specifically relates to authorizations and permissions, and specifically relates to local authorization for users.

A cloud service provider (CSP) provides the infrastructure and resources that are used for providing cloud services to subscribing customers. The CSP-provided resources can include hardware and software resources. These resources can include, for example, compute resources (e.g., computer systems, virtual machines, containers, applications, processors), memory resources (e.g., databases, data stores), networking resources (e.g., routers, load balancers), identity and access management resources, and other resources. The resources provided by a CSP for providing a set of cloud services to subscribing customers are typically organized into data centers, each data center comprising one or more computing systems or host machines. A data center may be configured to provide a particular set of cloud services. The CSP is responsible for equipping and configuring the data center with compute, memory, and networking and resources that are used to provide that particular set of cloud services. A CSP may provide one or more data centers depending upon the number of subscribing customers and based upon the locations of the customers.

A CSP may provide multiple cloud services to subscribing customers. These services may be provided under different models including a Software-as-a-Service (SaaS), Platform-as-a-Service (PaaS), an Infrastructure-as-a-Service (IaaS) model, and others. In the cloud environment, an identity management system is generally provided by the CSP to control user access to resources provided or used by a cloud service. Typical services or functions provided by an identity management system include, without restriction, single sign-on capabilities for users, authentication and authorization services, and other identity-based services.

The resources that are protected by an identity management system can be of different types such as compute instances, block storage volumes, virtual cloud networks (VCNs), subnets, route tables, various callable APIs, internal or legacy applications, and the like. These resources include resources stored in the cloud and/or customer on-premise resources. Each resource is typically identified by a unique identifier (e.g., an ID) that is assigned to the resource when the resource is created.

A CSP may provide an Infrastructure Identity and Access Management (IAM) system for controlling access to cloud resources for IaaS applications and services provided by the CSP. IAM may, for example, be an attribute-based access control (ABAC) system, also known as policy-based access control system, which defines an access control paradigm whereby access rights are granted to users through the use of policies that express a complex Boolean rule set that can evaluate many different attributes. The purpose of ABAC is to protect objects such as data, network devices, and IT resources from unauthorized users and actions—those that don't have "approved" characteristics as defined by an organization's security policies.

A user may establish a tenancy with the CSP. The tenancy may define the user account within the CSP and outline the subscribed services, authorization actions, and allocated resources for the user or organization. A client device of the tenant can connect to the computing environment and, through the tenancy, access the data of the tenant and subscribed to services. Compartments may refer to a grouping within a tenancy that organizes cloud resources.

To determine whether a user may access a resource in a compartment of a tenancy, an authorization request can be made by a service to an identity data plane (IDDP) service, according to an access management service principal. The authorization engine may use access management service metadata to populate the context of the authorization request. Such context may include attributes of a cloud infrastructure resources involved in the authorization request, for example, the network source of the request, the status of a tenancy, etc. The authorization engine may then use the policy for each compartment in the compartment chain to generate the authorization response. A policy may refer to an access control rule that defines what actions users, groups, or other entities can perform on resources within the compartment. The compartment chain can be a hierarchy of compartments within the tenancy. The access management service metadata may, for example, consist of the metadata of the principal, the metadata about tenancies involved in the authorization request, the information about compartments involved in an authorization request, the compartment hierarchy in the target tenancy, and policies under involved compartments.

Current methods do not support object level authorization and only utilize bucket level attributes in a request. However, abject storage service supports a boundless number of objects in a bucket, and applying object level attributes to authorization requests made by storage service may render the current cache response useless and cause multiple magnitudes of higher traffic to the identity data plane.

Embodiments described herein address the above-referenced issues by providing techniques that allow for authorization context transformation of object storage hosts and local authorization evaluation.

In some embodiments, a request is received by the computer system from a user. The request can be made by a user to take a specific action on a specific endpoint. In some embodiments, the user may request access to an application, such as an Application Programming Interface (API) within the system. In some embodiments, the request can include a signed request and/or can include one or several tokens for use in identifying the user and/or authenticating the request. Identifying information may also be received from the user and may be part of the request received or may be separate from the request received. In some embodiments, this information can be generated by the application through the API, through which the request is generated. This information can identify, for example, the user requesting to take the action, the current domain of the user, the action requested by the user, and the endpoint affected by the action. In some embodiments, the information can include a signed request and/or can include one or more tokens for use in identifying the user and/or authenticating the request.

The request can be authorized by the access management service system according to the authorization policies of the system. In some embodiments, this can include receiving the signed request and validating the signed request and/or determining an involved principal associated with the request. In some embodiments, the involved principal can be the principal of the user making the request.

Techniques described herein relate to storing caches of metadata on client hosts (object storage service hosts), using the cached metadata to evaluate authorization requests to get authorization responses, and provide authorization responses to the client.

In some embodiments, a user may use a user device to access data. The user device may request access for the data from a local authorization client, the local authorization client may maintain a data cache with authentication details that may be used to evaluate an authorization request locally instead of relying on an authorization service to evaluate the request. The local authorization client may evaluate the authorization request locally using the cache data and return an authorization response. Prior to evaluating the authorization request, the local authorization client may check the cache data for its "freshness," meaning the length of time it has been stored in the data cache. The freshness determination may be done based on a timestamp of the cache data. For example, if the cache data exceeds a threshold amount of time for cache storage, the local authorization client may make further considerations to determine whether to use the data to evaluate the authorization request. The determination may also be based on, a second threshold amount of time. For example, if the cache data has been stored for greater than a first threshold amount of time (e.g., five minutes) but less than a second threshold amount of time (e.g., sixty minutes) then the local authorization client may proceed with responding to the authorization request using the stored cache data and asynchronously request updated data from the authorization service. In another example, if the cache data has been stored in the cache for greater than a second threshold amount of time (e.g., sixty minutes), then the local authorization client may synchronously request updated data from the authorization service and then use the updated data to respond to the authorization request. Similarly, if there is no data stored in cache, the local authorization client may send a synchronous request to the authorization service for the required data to use for evaluating the authorization request.

FIG. 1 is a schematic illustration of a system for cache retrieval approach for authorization at a local authorization client, according to some embodiments. A user may use a user device, such as user device 102, to access data in webservers 108. In some embodiments, the user must be authorized to access data stored on a local client service in webservers 108. An Authorization Software Development Kit ("Auth SDK") may be part of the access management service and an allow the authorization client or the local client service to communicate with the authorization service.

Embodiments of the present disclosure describe an authorization service that can take place at the user device. This provides a low latency authorization solution and allows for flexibility in how data is retrieved and stored. In some embodiments, a local authorization client, such as local authorization client 110, may contain a metadata cache, such as metadata cache 115, where data required to evaluate an authorization request can be stored. Ideally, the cache data is 'fresh.' Additionally, some embodiments of the present disclosure teach methods and systems for retrieving and updating the cache data to reduce the latency of such authorization requests and improve the user experience. In an example, the methods and systems may apply a set of rules when the local client service is down. If the user device contains relatively new cache data, the access management service may proceed with evaluating the authorization request using the data available. The access management service may further request updated data from the local authorization service at a later time, thus, refreshing the cache data for the next time it is requested.

The new Auth SDK process is motivated by a service request from the service team called object level authorization. To support this authorization, the system and method may inject many (e.g., millions) of different kinds of object names. This means that many new hash keys must be submitted to retrieve the data. Further, instead of caching authorization requests, the local service may cache access management service metadata. When evaluating a new authorization request, the new Auth SDK may fetch access management service metadata that will evaluate the authorization request locally on the object storage service host. Accordingly, only data required to evaluate the authorization request is stored in the cache.

Turning back to FIG. 1, service 101 allows a user to request access to data. This authorization request may be evaluated on local authorization client 110. In some embodiments, user device 102 may communicate with webservers 108 in object storage 104. The communication may include a request to access data. The user device 102 may send an authorization request to access data stored in object storage 104. In some embodiments, the authorization request may be evaluated at webservers 108. Webservers 108 may include local authorization client 110 which comprises authorization engine 112 and metadata cache 115.

Local authorization 110 client may maintain metadata cache 115 with authentication details that may be used to evaluate an authorization request locally at object storage 104 instead of relying on authorization service 116 to evaluate the request. In some embodiments, authorization engine 112 may determine that there is metadata stored in metadata cache 115. If there is data stored in metadata cache 115, authorization engine 112 may evaluate the authorization request locally and return an authorization response. Additionally, local authorization client 110 may check the data in metadata cache 115 for its "freshness." If data is stored in the cache but it exceeds a threshold amount of time since for cache storage, then local authorization client 110 may determine whether to proceed with using the data to evaluate the authorization request. The determination may be based on, for example, a second threshold amount of time.

For example, if the cache data has been stored for greater than a first threshold amount of time (e.g., five minutes) but less than a second threshold amount of time (e.g., sixty minutes) then local authorization client 110 may proceed with responding to the authorization request using the stored cache data and asynchronously send metadata request 120 to request updated data from authorization service 116.

Authorization service 116 and metadata store 119 are part of identity 106. Authorization service 116 is a data store that provides APIs for retrieving the cached data that is stored in the metadata store 118 in identity 106. Once the authorization service 116 retrieves the updated data from metadata store 118, authorization service 116 may send metadata response 122 to local authorization client 110 with the updated cache data and store the updated data in metadata cache 115.

In another example, if the cache data has been stored in metadata cache 115 for greater than a second threshold amount of time (e.g., sixty minutes), then local authorization client 110 may synchronously send metadata request 122 to request updated data from authorization service 116 and then use metadata response 122 data to respond to the authorization request. The data from metadata response 122 may be stored in metadata cache 115.

Similarly, if there is no data stored in metadata cache 115, local authorization client 110 may send synchronous metadata request 120 to authorization service 116 for the required data and use metadata response 122 to evaluate the authorization request. The data from metadata response 122 may be stored in metadata cache 115.

Local Authorization

Figure 2:
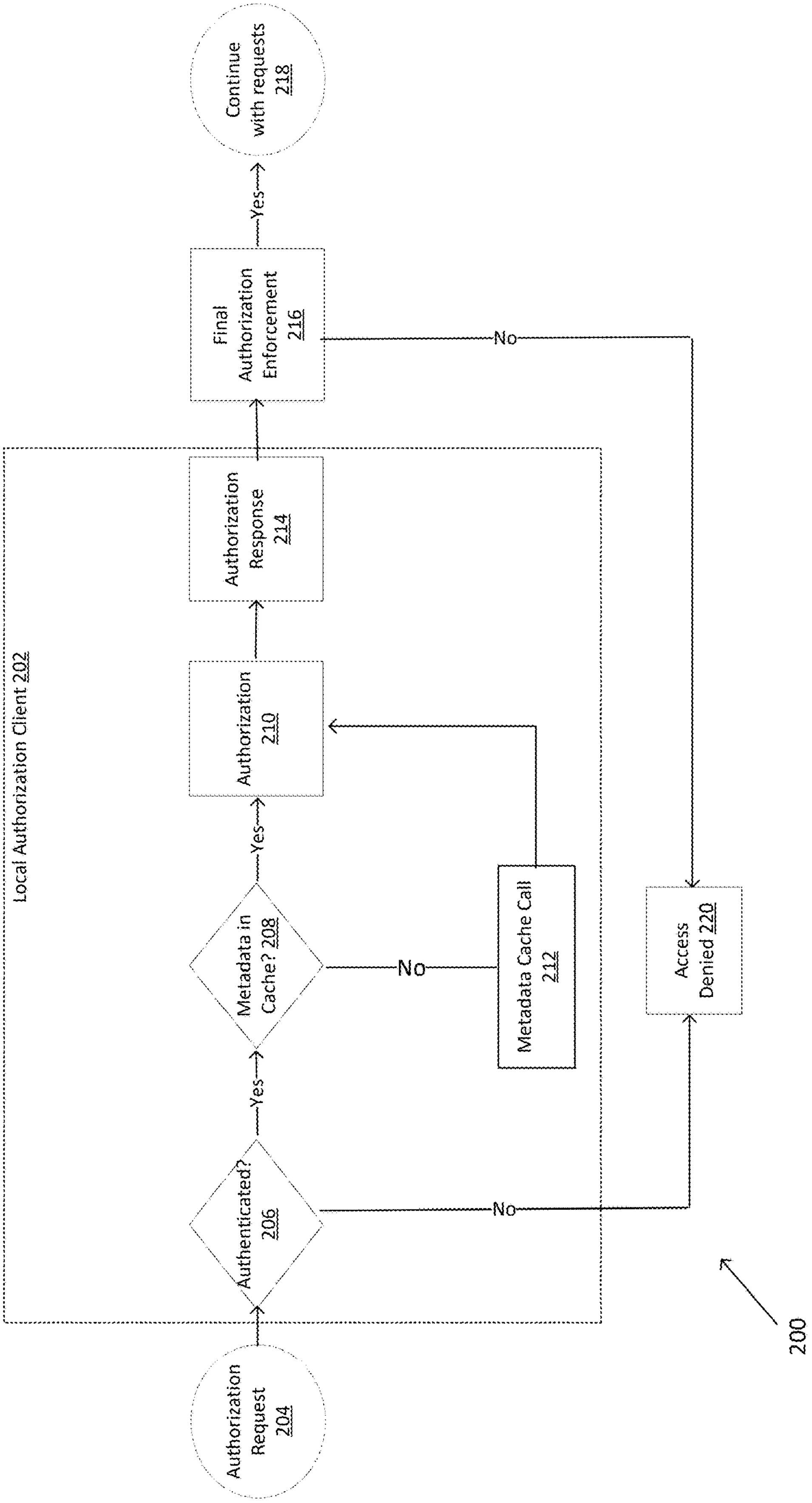
FIG. 2 is a block diagram illustrating a process for local authorization of an authorization request, according to some embodiments.

FIG. 2 is a block diagram illustrating a process for local authorization of an authorization request, according to some embodiments.

While the operations of processes 200 and 400 (described below) are described as being performed by generic computers, it should be understood that any suitable device may be used to perform one or more operations of these processes. Processes 200 and 400 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

At operation 204 an authorization request is sent to local authorization client 202. Local authorization client 202 may pre-process the authorization request and generate cache keys. At operation 206, local authorization client 202 verifies an entity's identity and determines what network resources an the entity is allowed to access and the actions it may perform, e.g., read, write, modify, and/or delete. According some embodiments, an entity can be authenticated using multi-factor authentication. Each user may have a server running on the cloud dedicated to that user. Each client computing system may have an object storage computer dedicated to that user. If the user has been properly authenticated, local authorization client 202 may proceed to check for the required metadata in the cache. If the user has not been properly authenticated, access will be denied, as illustrated at operation 220.

Local authorization client 202 may generate cache keys for each request. Example 1 is an example method of generating a cache key.

Example 1

```
AuthorizationRequest authzRequest;
CacheKey cacheKey = getCacheKey(authzRequest)
```

At operation 208, local authorization client 202 may check for cache metadata from the authorization service using the cache keys. In an example, local authorization client 202 may check each cache for required cache data (e.g., via getIfPresent), check the freshness of the data, and decide if the data is stale so as to require a refresh. Further local authorization client 202 may maintain a list of cache entries that need a refresh. Local authorization client 202 may also use local variables to store fresh cache entries. Example 2 is an example check for required cache data:

Example 2

```
CacheData cacheData = cCache.getIfPresent (cacheKey)
if not cacheData is null or stale:
        prepare runnable task for next step
else:
        LocalVariable.setCacheData (cacheData)
```

If local authorization client 202 determines that the required data is stored in the cache, local authorization client 202 may proceed to operation 210 and perform the authorization. If local authorization client 202 determines that the required data is not stored in cache, local authorization client 202 may perform a metadata cache call at operation 212 for the cache data corresponding to the required data.

At operation 212, local authorization client 202 may, for example, use a thread pool to fetch data from IDDP server concurrently for stale cache entries, join the threads and wait for threads for return value. Local authorization client 202 may then update the corresponding cache with the retrieved data and add cache values to local variables for later usage in an authorization request.

At operation 212, local authorization client 202 can implement a locking mechanism at the cache key level. The locking mechanism may be configured to ensure that, for a given cache, only one refresh is triggered for that same cache key if multiple authorization requests are trying to get the value of the same cache using the same cache key. An advantage of the locking mechanism is that it maintains "one round trip," and the latency of this trip would be worse if multiple parallel requests were sent under the hood. Example 3 is an example of generating the locking mechanism and blocking subsequent requests for the same data.

Example 3

```
class CacheTasks implements Callable<V> {
   public CacheThread(K k) { }
     public V call( ) {
          V v = cache.getIfPresent (k); //duplicate with the check inside the
synchronized block, but allows best-effort bypass without locking
          if (v != null && v.timestamp newerThan now-4min) {
               return v;
          }
          synchronized(k) { //lock on a per-key level
               v = cache.getIfPresent(k); //first check if another thread
already refreshed
               if (v != null && v.timestamp newerThan now-4min) {
                    return v;
               }
               v = load(k); //otherwise do the synchronous load
               cache.put(k, v);
               return v;
          }
     }
List<Callable<CacheDataResponse>> tasks;
List<Future<CacheDataResponse>> results = ThreadPool.executeAll(tasks)
for (Future<CacheDataResponse> result : results) {
          CacheDataResponse cacheDataResponse = result.get( );
               cache.put(cacheKey, [cacheDataResponse.cacheValue,
creationTimestamp])
                    LocalVariable.setCacheData(cacheDataResponse.cacheValue)
}
```

At operation 210, the caches are populated with the required data to evaluate the authorization request. At this operation, local authorization client 202 can use the existing data in cache to locally perform the authorization. In an example, the authorization is done based on the policy access to the information. Using the cache data, an authorization response may be generated at operation 214. At operation 216, the authorization response may be provided to the service and lets the service apply the final authorization enforcement using the authorization responses.

Cache Storage

In some embodiments, cache information may be kept locally and may include additional information about the principal, the compartment, the tenancy, policy, etc. of the cache data. This additional information may also be received from the authorization service. This data may be stored locally at object storage and used to evaluate an authorization request locally. To avoid redundancy in metadata storage, the local cache may be broken down into various caches, so that each cache only contains a single category of metadata. These caches may include, for example, a principal cache, compartment cache, tenancy cache, policy cache, and compartment relationship cache.

The principal cache may contain metadata about principals, such as what domain the principal is from, what group/dynamic-group the principal belongs to, etc. The principal cache may contain additional metadata information for a principal apart from what is provided by the authorization request. The compartment cache may contain metadata about compartments, like what state the compartment is in, what is the parent compartment of the current compartment, etc. The tenancy cache may contain metadata about tenancies, like what are the network sources defined in the tenancy, is the tenancy registered as a service, etc. The policy cache may contain policies for individual compartments. The compartment relationship cache may contain all the compartment chains for any tenancies.

In some embodiments, the authorization request only contains the target compartment cloud identifier (CID) which may be the only CID known in the target tenancy. However, some policies in parent compartments and root compartments may apply to resources in child compartments, and therefore, authorization requires the full compartment chain, from the target compartment up to the root compartment for each request. Therefore, a special cache may be implemented for this metadata which contains information about the CID of the direct parent compartment for a given compartment and the CID of the root compartment (tenancy CID) for a given compartment. This metadata may also contain the compartment chain relationship.

Figure 3:
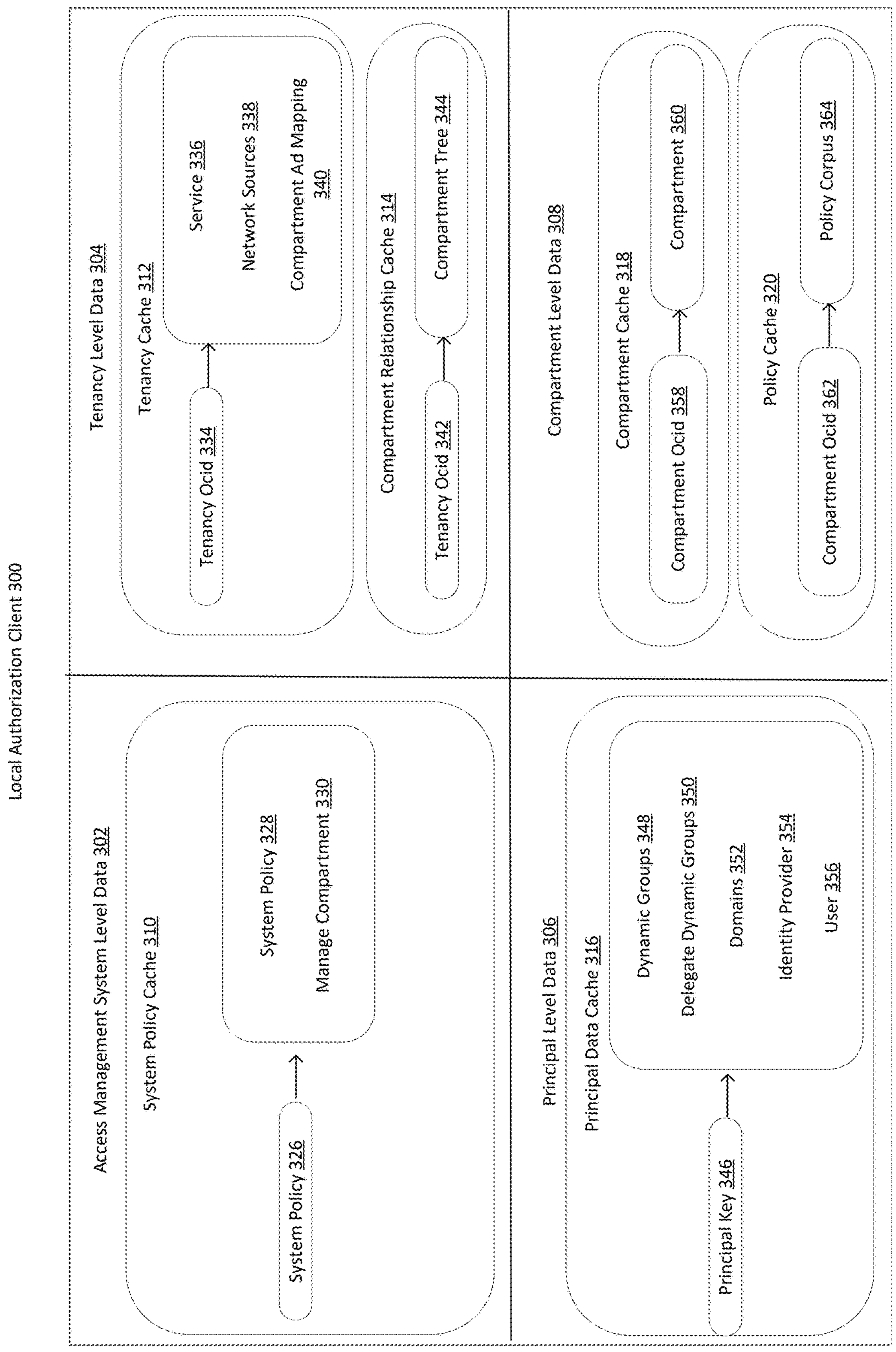
FIG. 3 is a block diagram illustrating cache organization at a local authorization client, according to some embodiments.

FIG. 3 is a block diagram illustrating cache organization at local authorization client 300, according to some embodiments. Local authorization client 300 may contain, for example, system policy cache 310, tenancy cache 312, compartment relationship cache 314, principal data cache 316, compartment cache 318, and policy cache 320. Local authorization client 300 receives a request to check for metadata used in the various caches. To avoid a latency issue, the caches are organized in such a way that when the object storage service sends an authorization request to local authorization client 300, it may construct a different key for each cache using the information present in the authorization request. This, for example, may include user ID. Further, a lock may be created for each key. The lock may be configured to ensure that only one thread for a cache request is sent to the cache population flow to avoid redundant requests for the same data.

For each key, local authorization client 300 may determine if there is an existing entry inside the local cache. If there is a cache missing from the entry, then local authorization client 300 may request this data using a synchronous call. If there is cache data, then it may determine if the cache is "fresh" and proceed as further described herein.

In some embodiments, a multilevel cache memory system stores certain cache data in particular levels of the multilevel cache in local authorization client 300. There may be operations or messages that pertain to data stored only in certain levels of a multilevel cache. For example, the various data levels of the cache in local authorization client 300 may include access management system level data 302, tenancy level data 304, principal level data 306, and compartment level data 308.

When a cache key is received, it may correspond to related cache data. Each cache key may correspond to cache data stored in a particular cache. For example, a cache key may correspond to system policy 326 in system policy cache 310. The cache data that is stored in system policy cache 310 may then be retrieved. System policy cache 310 may include data about system policy 328 and management compartment 330.

In another example, the cache key may correspond with tenancy CID 334 in tenancy cache 312. This will return a different set of cache data. The tenancy cache may include data about service 336, network sources 338, and/or compartment ad mapping 340.

Even further, a cache key may correspond to tenancy CID 324 for data in compartment relationship cache 314. This may return a different set of cache data than that requested in tenancy CID 334 in tenancy cache 312. Compartment relationship cache 314 may include data about compartment tree 334.

Next, the cache key that corresponds to principal key 346 at principal data cache 316 may retrieve cache data about dynamic groups 348, delegate dynamic groups 350, domains 352, identity providers 354, and/or users 356. The cache key that corresponds to compartment CID 358 in compartment cache 318 may contain cache data about compartment 360. The cache key that corresponds to compartment CID 362 in policy cache 320 may include cache data about policy corpus 364.

Parallelized Cache Retrieval

Having multiple caches can create a challenge for local authorization workflow since each cache needs to provide access management service metadata that has been updated within a determined amount of time, and refreshing caches serially is slow. Instead, in some embodiments, a new customized cache loader may be added in the local authorization client. When an authorization request comes to the Auth SDK, the Auth SDK may generate cache keys for each cache using information from the authorization request and use cache keys to check data presence in local caches. The service may then generate multiple concurrent requests for missing cache data, run the requests in parallel, and collect the requests once all requests are completed.

However, in a parallelized approach, duplicate cache requests may be sent if multiple requests are run at the same time and there are cache misses. This may happen because each request may make the Auth SDK send cache requests due to cache absence. In some embodiments, the system may apply a locking mechanism in the customized cache loader which uses the cache key as a lock while spinning up a cache request and only keep one ongoing cache request for a given cache key at a time. This locking mechanism can prevent duplicate cache requests.

SYNC/ASYNC Cache Refresh

The brutal way to perform a cache refresh is to refresh the cache entry synchronously when the cache has been stored in data for longer than a determined amount of time (e.g., five minutes). However, this approach could result in high latency for processing authorization requests periodically, since there are specific sets of access management service data that need to be fetched synchronously every time it passes the determined amount of time. In some embodiments of the present disclosure, the system and methods may use a combination of synchronous and asynchronous refresh methods. Asynchronous refreshes may be done when cache entries are relatively "fresh." Fresh meaning the cache has been stored for greater than a determined amount of time but not for too long (e.g., the cache data has been stored for longer than five minutes but less than sixty minutes). Various synchronization processes may be applied. For example, hot cache entries will be refreshed asynchronously which will ensure that hot cache entries are always ready to be used while processing authorization requests.

The ability to determine a synchronization approach is important because cache data should be updated frequently while providing low latency responses. Cache data that has been stored in cache for longer than a threshold amount of time, e.g., greater than five minutes, is considered stale. In a normal setting, where all systems and servers are working, it is preferred to retrieve "fresh" cache data when it exceeds its time to live (TTL). However, conditions are not always ideal, and one of the advantages in the present disclosure is the ability to create different rules for different stages of a cache data storage life to best accommodate various scenarios. For example, a standard TTL may be set at five minutes. If a server is down and the data is six minutes old, the system may be configured to return the data even though it is "stale." Data may also be "expired" meaning it has been stored for longer than a second determined threshold, e.g., sixty minutes.

Cache Flow

First, the authorization request may be pre-processed, and cache keys may be generated for query usage. The local authorization client may internally maintain several caches and the key to each cache may be different. Information may be extracted from the request, such as the primary principal's tenancy CID, target compartment CID, etc. This information may be used to generate the cache key for each access management service metadata cache.

Second, a check for cache data presence can be performed. For example, using the cache keys, a check can be performed for corresponding cache data. If the cache entry is already present, the service may retrieve the information from the cache and check if the data is still fresh using a timestamp which may be attached to each cache entry when it has last been modified. If the data is fresh, there may be no need for a refresh and the cache entry may be stored in a local variable and may be used later in the local authorization flow. If the data is not fresh (i.e., stale), the service may fetch the cache data concurrently in the authorization flow using a thread pool.

The local authorization client may use a shared thread pool to send cache data requests to the IDDP service to fetch cache data for each single cache in parallel. A custom loader may be implemented for each single cache and a lock may be kept on each cache entry to make sure that there is only one network request for a given cache key and to ensure that duplicate cache load requests are not sent for the same cache key. The local authorization client may wait for all the cache requests to finish and store the returned data in local variables. At this point, the authorization client may have the access management service metadata required for local authorization.

The local authorization client may further execute an authorization logic locally (discussed in greater detail with reference to FIG. 2) and return the result. The described cache flow is exemplary and should not be construed as limiting.

Figure 4:
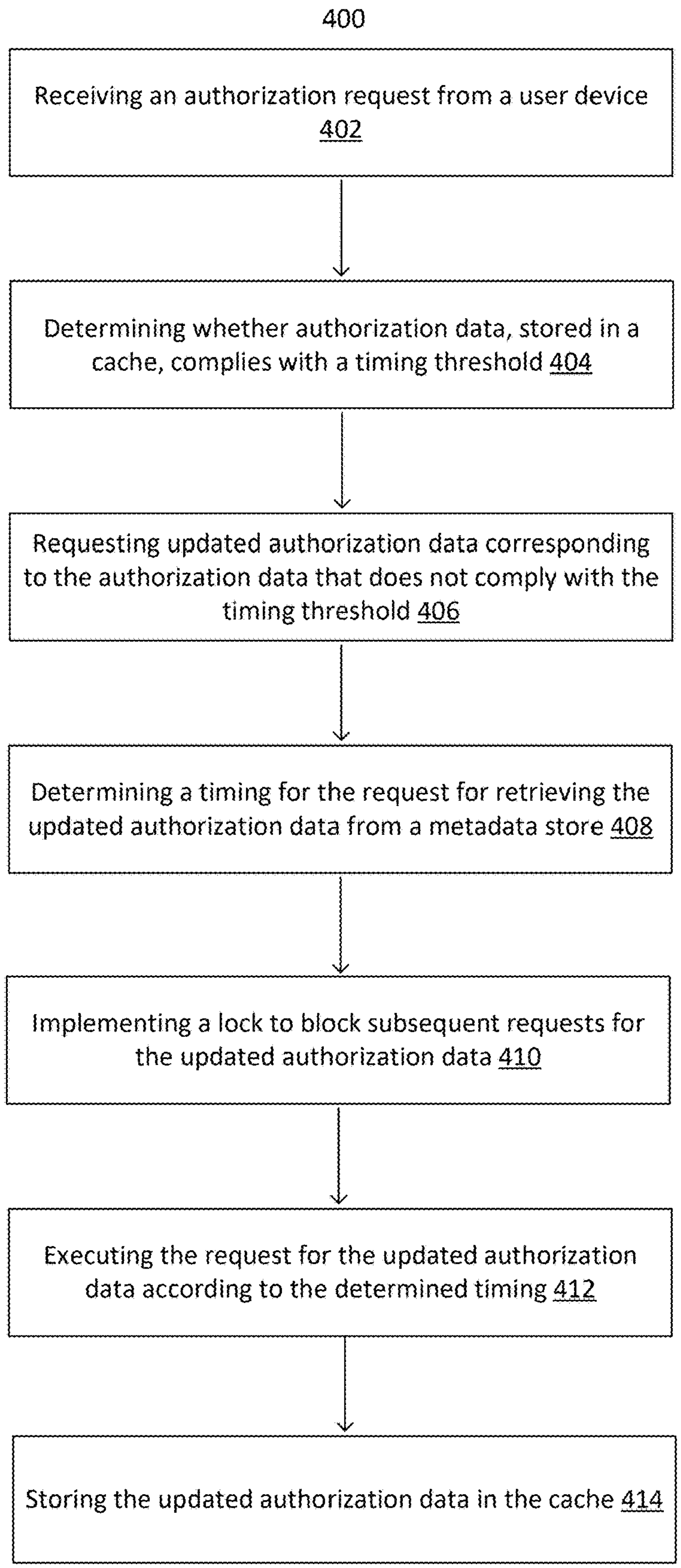
FIG. 4 is a flowchart illustrating a process for generating an authorization response, according to some embodiments.

Use and Update Cached Metadata to Evaluate Authorization Request and Get Authorization Response FIG. 4 is a flowchart illustrating a process 400 for generating an authorization response, according to some embodiments. At operation 402, an authorization request is received by the local authorization client from a user device. At operation 404, the local authorization client may determine where authorization data, stored in the cache, complies with a timing threshold. As described above, in an example, the timing threshold may be predetermined (e.g., five minutes). If the cache data has been stored in the cache for longer than the threshold time period, then the data may be "stale." Determining whether cache data complies with a timing threshold may be done using a timestamp which may be attached to each cache entry when it is has last been modified.

In accordance with the determination that the cache data does not comply with the timing threshold, meaning that it has been stored in cache for greater than the determined time, at operation 406, the local authorization client may request updated authorization data. The updated authorization data may correspond to the authorization data that does not comply with the timing threshold.

At operation 408, the local authorization client may determine a timing for the request for retrieving the updated authorization data from a metadata store. As discussed above, the timing for the request may be determined based on a variety of factors. For example, the state of the server and whether the server is down. In another example, the timing for the request may be based on how much the cache data deviates from the timing threshold. For example, there may be a second timing threshold that determines an upper boundary of time for which cache data may be used. For example, if the cache data has been stored in cache for longer than five minutes but less than sixty minutes, the local authorization client may be configured to use the cache data in evaluating the authorization request. In an example where the cache data does not comply with a first timing threshold but complies with a second timing threshold, the request for retrieving the updated authorization data may occur after the cache data that is currently stored in cache is used for evaluating the authorization request.

At operation 410, the local authorization client may implement a lock to block subsequent requests for the updated authorization data. As described above, the locking mechanism may be configured to ensure that, for a given cache, only one single refresh is triggered for that same cache key if multiple authorization requests are trying to get value for the same cache using the same cache key.

At operation 412, the local authorization client may execute the request for the updated authorization data according to the determined timing. At operation 414, the local authorization client may store the updated authorization data in the cache for use in an authorization request.

Various embodiments may be implemented to determine the timing for the request. The examples provided are exemplary and should not be construed as limiting. Additional examples of timing for the request include determining whether the request may be sent synchronously or asynchronously. As discussed above, the request for retrieving the updated authorization data may occur after the cache data that is currently stored in cache is used for evaluating the authorization request.

In another example, if no data is stored in the cache, the request for retrieving the updated authorization data may occur before or concurrently to generating an authorization response. When the request for the updated authorization data is sent before or concurrently to an authorization response being generated, then the request is considered synchronous. In another example, if the cache data has been stored in cache for greater than a first timing threshold and a second timing threshold, similarly, the request for retrieving the updated authorization data may occur before an authorization response is generated (i.e., a synchronous request).

Additional variations may be applied. For example, if the cache data has been stored in the cache for longer than a first timing threshold, the request for retrieving the updated authorization data may occur after an authorization response is generated. When the request for the updated authorization data is sent after an authorization response is generated, then the request is considered asynchronous. In this way, the cache data is updated for later use in the authorization request.

In another example, if the cache data meets the first timing threshold, similarly, an asynchronous request may be sent. An advantage of such embodiments is the ability to predict when data is about to go stale without affecting the current latency of the system. An advantage of retrieving updated (or "fresh") authorization data at this step is to provide updated data in the cache for the next time the data is requested. Otherwise, a synchronous request for the data would have to occur the next time the data is requested.

In some embodiments, a synchronous request may be sent if the authorization service is working, and an asynchronous request may be sent if the authorization service is not working. Ideally a user would only use data that is "fresh" and meets all timing thresholds. One advantage of the present disclosure is the ability to create rules for when an authorization service is down. Therefore, it is advantageous to determine a first timing threshold and a second timing threshold for determining the life of cache data while an authorization service is down.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand)) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 5:
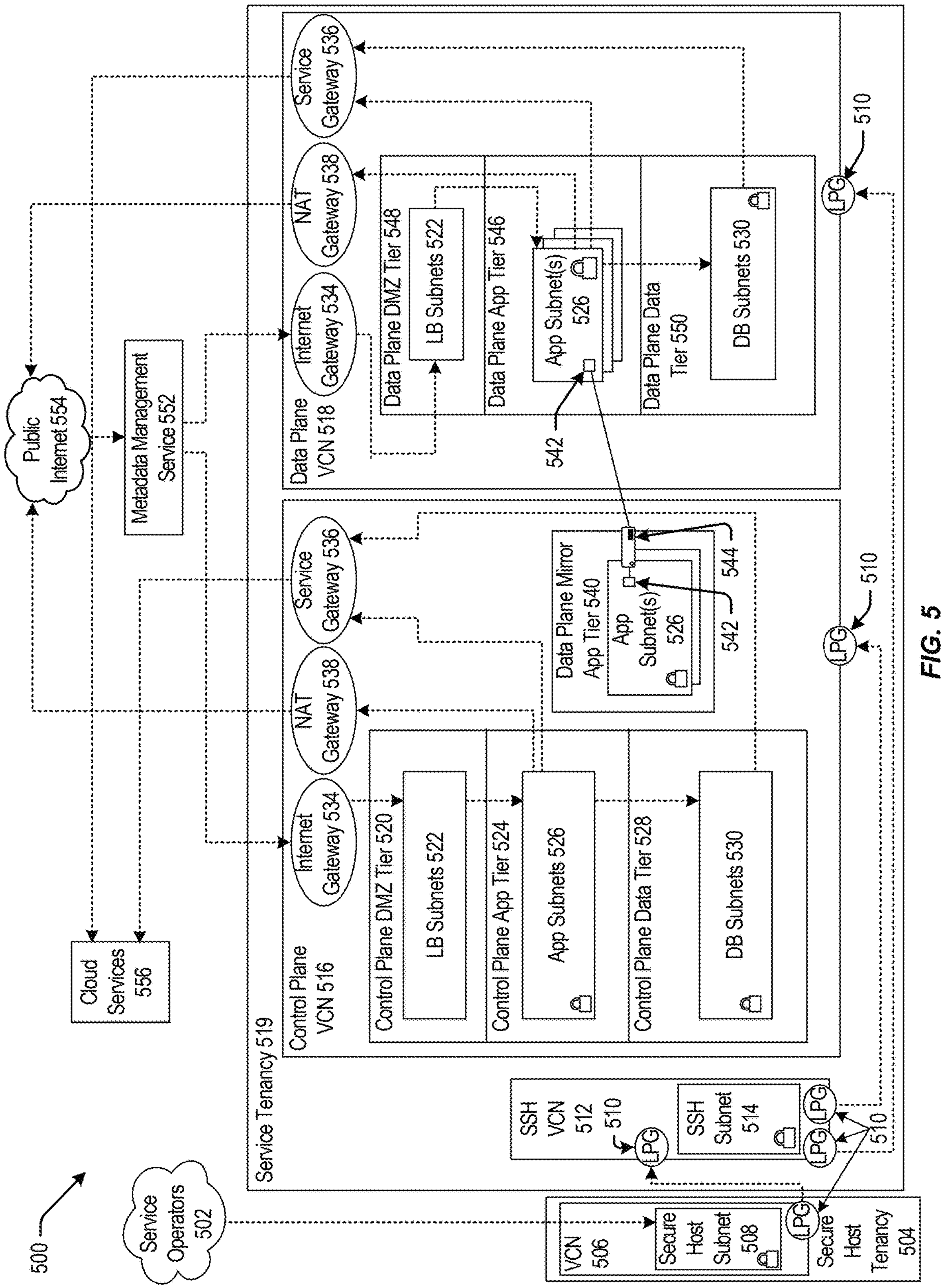
FIG. 5 is a block diagram illustrating a pattern for implementing a cloud infrastructure as a service system, according to some embodiments.

FIG. 5 is a block diagram illustrating a pattern for implementing a cloud infrastructure as a service system, according to some embodiments. Service operators 502 can be communicatively coupled to a secure host tenancy 504 that can include a virtual cloud network (VCN) 506 and a secure host subnet 508. In some examples, the service operators 502 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 506 and/or the Internet.

The VCN 506 can include a local peering gateway (LPG) 510 that can be communicatively coupled to a secure shell (SSH) VCN 512 via an LPG 510 contained in the SSH VCN 512. The SSH VCN 512 can include an SSH subnet 514, and the SSH VCN 512 can be communicatively coupled to a control plane VCN 516 via the LPG 510 contained in the control plane VCN 516. Also, the SSH VCN 512 can be communicatively coupled to a data plane VCN 518 via an LPG 510. The control plane VCN 516 and the data plane VCN 518 can be contained in a service tenancy 519 that can be owned and/or operated by the IaaS provider.

The control plane VCN 516 can include a control plane demilitarized zone (DMZ) tier 520 that acts as a perimeter network (e.g., portions of a corporate network between the corporate intranet and external networks). The DMZ-based servers may have restricted responsibilities and help keep breaches contained. Additionally, the DMZ tier 520 can include one or more load balancer (LB) subnet(s) 522, a control plane app tier 524 that can include app subnet(s) 526, a control plane data tier 528 that can include database (DB) subnet(s) 530 (e.g., frontend DB subnet(s) and/or backend DB subnet(s)). The LB subnet(s) 522 contained in the control plane DMZ tier 520 can be communicatively coupled to the app subnet(s) 526 contained in the control plane app tier 524 and an Internet gateway 534 that can be contained in the control plane VCN 516, and the app subnet(s) 526 can be communicatively coupled to the DB subnet(s) 530 contained in the control plane data tier 528 and a service gateway 536 and a network address translation (NAT) gateway 538. The control plane VCN 516 can include the service gateway 536 and the NAT gateway 538.

The control plane VCN 516 can include a data plane mirror app tier 540 that can include app subnet(s) 526. The app subnet(s) 526 contained in the data plane mirror app tier 540 can include a virtual network interface controller (VNIC) 542 that can execute a compute instance 544. The compute instance 544 can communicatively couple the app subnet(s) 526 of the data plane mirror app tier 540 to app subnet(s) 526 that can be contained in a data plane app tier 546.

The data plane VCN 518 can include the data plane app tier 546, a data plane DMZ tier 548, and a data plane data tier 550. The data plane DMZ tier 548 can include LB subnet(s) 522 that can be communicatively coupled to the app subnet(s) 526 of the data plane app tier 546 and the Internet gateway 534 of the data plane VCN 518. The app subnet(s) 526 can be communicatively coupled to the service gateway 536 of the data plane VCN 518 and the NAT gateway 538 of the data plane VCN 518. The data plane data tier 550 can also include the DB subnet(s) 530 that can be communicatively coupled to the app subnet(s) 526 of the data plane app tier 546.

The Internet gateway 534 of the control plane VCN 516 and of the data plane VCN 518 can be communicatively coupled to a metadata management service 552 that can be communicatively coupled to public Internet 554. Public Internet 554 can be communicatively coupled to the NAT gateway 538 of the control plane VCN 516 and of the data plane VCN 518. The service gateway 536 of the control plane VCN 516 and of the data plane VCN 518 can be communicatively coupled to cloud services 556.

In some examples, the service gateway 536 of the control plane VCN 516 or of the data plane VCN 518 can make application programming interface (API) calls to cloud services 556 without going through public Internet 554. The API calls to cloud services 556 from the service gateway 536 can be one-way: the service gateway 536 can make API calls to cloud services 556, and cloud services 556 can send requested data to the service gateway 536. But, cloud services 556 may not initiate API calls to the service gateway 536.

In some examples, the secure host tenancy 504 can be directly connected to the service tenancy 519, which may be otherwise isolated. The secure host subnet 508 can communicate with the SSH subnet 514 through an LPG 510 that may enable two-way communication over an otherwise isolated system. Connecting the secure host subnet 508 to the SSH subnet 514 may give the secure host subnet 508 access to other entities within the service tenancy 519.

The control plane VCN 516 may allow users of the service tenancy 519 to set up or otherwise provision desired resources. Desired resources provisioned in the control plane VCN 516 may be deployed or otherwise used in the data plane VCN 518. In some examples, the control plane VCN 516 can be isolated from the data plane VCN 518, and the data plane mirror app tier 540 of the control plane VCN 516 can communicate with the data plane app tier 546 of the data plane VCN 518 via VNICs 542 that can be contained in the data plane mirror app tier 540 and the data plane app tier 546.

In some examples, users of the system, or customers, can make requests, for example create, read, update, or delete (CRUD) operations, through public Internet 554 that can communicate the requests to the metadata management service 552. The metadata management service 552 can communicate the request to the control plane VCN 516 through the Internet gateway 534. The request can be received by the LB subnet(s) 522 contained in the control plane DMZ tier 520. The LB subnet(s) 522 may determine that the request is valid, and in response to this determination, the LB subnet(s) 522 can transmit the request to app subnet(s) 526 contained in the control plane app tier 524. If the request is validated and requires a call to public Internet 554, the call to public Internet 554 may be transmitted to the NAT gateway 538 that can make the call to public Internet 554. Metadata that may be desired to be stored by the request can be stored in the DB subnet(s) 530.

In some examples, the data plane mirror app tier 540 can facilitate direct communication between the control plane VCN 516 and the data plane VCN 518. For example, changes, updates, or other suitable modifications to configuration may be desired to be applied to the resources contained in the data plane VCN 518. Via a VNIC 542, the control plane VCN 516 can directly communicate with, and can thereby execute the changes, updates, or other suitable modifications to configuration to, resources contained in the data plane VCN 518.

In some embodiments, the control plane VCN 516 and the data plane VCN 518 can be contained in the service tenancy 519. In this case, the user, or the customer, of the system may not own or operate either the control plane VCN 516 or the data plane VCN 518. Instead, the IaaS provider may own or operate the control plane VCN 516 and the data plane VCN 518, both of which may be contained in the service tenancy 519. Such embodiments can enable isolation of networks that may prevent users or customers from interacting with other users', or other customers', resources. Also, these embodiments may allow users or customers of the system to store databases privately without needing to rely on public Internet 554, which may not have a desired level of threat prevention, for storage.

In other embodiments, the LB subnet(s) 522 contained in the control plane VCN 516 can be configured to receive a signal from the service gateway 536. In some embodiments, the control plane VCN 516 and the data plane VCN 518 may be configured to be called by a customer of the IaaS provider without calling public Internet 554. Customers of the IaaS provider may desire these embodiments since database(s) that the customers use may be controlled by the IaaS provider and may be stored on the service tenancy 519, which may be isolated from public Internet 554.

Figure 6:
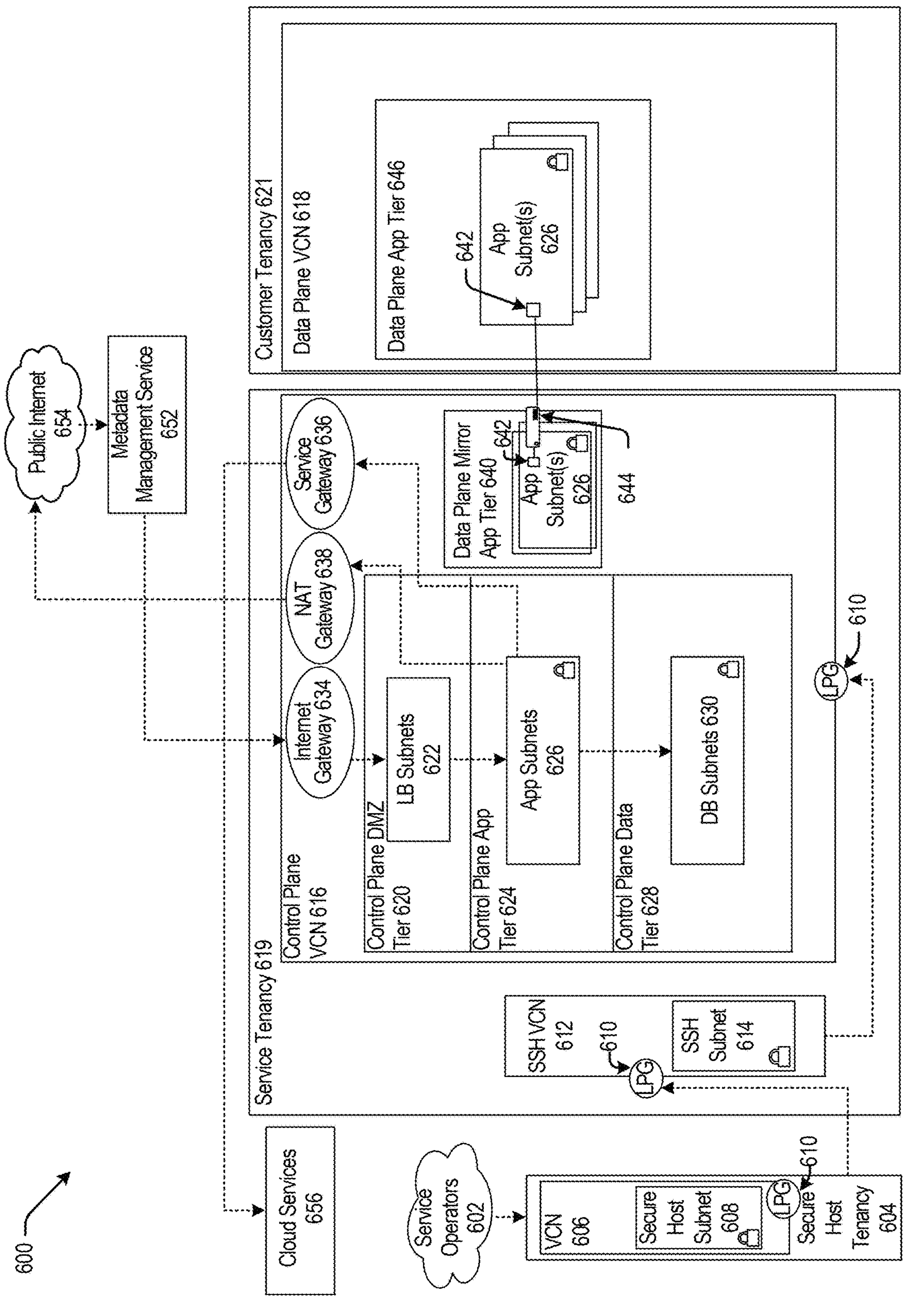
FIG. 6 is a block diagram illustrating a pattern for implementing a cloud infrastructure as a service system, according to some embodiments.

FIG. 6 is a block diagram illustrating a pattern for implementing a cloud infrastructure as a service system, according to some embodiments. Service operators 602 (e.g., service operators 502 of FIG. 5) can be communicatively coupled to a secure host tenancy 604 (e.g., the secure host tenancy 504 of FIG. 5) that can include a virtual cloud network (VCN) 606 (e.g., the VCN 506 of FIG. 5) and a secure host subnet 608 (e.g., the secure host subnet 508 of FIG. 5). The VCN 606 can include a local peering gateway (LPG) 610 (e.g., the LPG 510 of FIG. 5) that can be communicatively coupled to a secure shell (SSH) VCN 612 (e.g., the SSH VCN 512 of FIG. 5) via an LPG 510 contained in the SSH VCN 612. The SSH VCN 612 can include an SSH subnet 614 (e.g., the SSH subnet 514 of FIG. 5), and the SSH VCN 612 can be communicatively coupled to a control plane VCN 616 (e.g., the control plane VCN 516 of FIG. 5) via an LPG 610 contained in the control plane VCN 616. The control plane VCN 616 can be contained in a service tenancy 619 (e.g., the service tenancy 519 of FIG. 5), and the data plane VCN 618 (e.g., the data plane VCN 518 of FIG. 5) can be contained in a customer tenancy 621 that may be owned or operated by users, or customers, of the system.

The control plane VCN 616 can include a control plane DMZ tier 620 (e.g., the control plane DMZ tier 520 of FIG. 5) that can include LB subnet(s) 622 (e.g., LB subnet(s) 522 of FIG. 5), a control plane app tier 624 (e.g., the control plane app tier 524 of FIG. 5) that can include app subnet(s) 626 (e.g., app subnet(s) 526 of FIG. 5), a control plane data tier 628 (e.g., the control plane data tier 528 of FIG. 5) that can include database (DB) subnet(s) 630 (e.g., similar to DB subnet(s) 530 of FIG. 5). The LB subnet(s) 622 contained in the control plane DMZ tier 620 can be communicatively coupled to the app subnet(s) 626 contained in the control plane app tier 624 and an Internet gateway 634 (e.g., the Internet gateway 534 of FIG. 5) that can be contained in the control plane VCN 616, and the app subnet(s) 626 can be communicatively coupled to the DB subnet(s) 630 contained in the control plane data tier 628 and a service gateway 636 (e.g., the service gateway 536 of FIG. 5) and a network address translation (NAT) gateway 638 (e.g., the NAT gateway 538 of FIG. 5). The control plane VCN 616 can include the service gateway 636 and the NAT gateway 638.

The control plane VCN 616 can include a data plane mirror app tier 640 (e.g., the data plane mirror app tier 540 of FIG. 5) that can include app subnet(s) 626. The app subnet(s) 626 contained in the data plane mirror app tier 640 can include a virtual network interface controller (VNIC) 642 (e.g., the VNIC of 542) that can execute a compute instance 644 (e.g., similar to the compute instance 544 of FIG. 5). The compute instance 644 can facilitate communication between the app subnet(s) 626 of the data plane mirror app tier 640 and the app subnet(s) 626 that can be contained in a data plane app tier 646 (e.g., the data plane app tier 546 of FIG. 5) via the VNIC 642 contained in the data plane mirror app tier 640 and the VNIC 642 contained in the data plane app tier 646.

The Internet gateway 634 contained in the control plane VCN 616 can be communicatively coupled to a metadata management service 652 (e.g., the metadata management service 552 of FIG. 5) that can be communicatively coupled to public Internet 654 (e.g., public Internet 554 of FIG. 5). Public Internet 654 can be communicatively coupled to the NAT gateway 638 contained in the control plane VCN 616. The service gateway 636 contained in the control plane VCN 616 can be communicatively coupled to cloud services 656 (e.g., cloud services 556 of FIG. 5).

In some examples, the data plane VCN 618 can be contained in the customer tenancy 621. In this case, the IaaS provider may provide the control plane VCN 616 for each customer, and the IaaS provider may, for each customer, set up a unique compute instance 644 that is contained in the service tenancy 619. Each compute instance 644 may allow communication between the control plane VCN 616, contained in the service tenancy 619, and the data plane VCN 618 that is contained in the customer tenancy 621. The compute instance 644 may allow resources, that are provisioned in the control plane VCN 616 that is contained in the service tenancy 619, to be deployed or otherwise used in the data plane VCN 618 that is contained in the customer tenancy 621.

In other examples, the customer of the IaaS provider may have databases that live in the customer tenancy 621. In this example, the control plane VCN 616 can include the data plane mirror app tier 640 that can include app subnet(s) 626. The data plane mirror app tier 640 can reside in the data plane VCN 618, but the data plane mirror app tier 640 may not live in the data plane VCN 618. That is, the data plane mirror app tier 640 may have access to the customer tenancy 621, but the data plane mirror app tier 640 may not exist in the data plane VCN 618 or be owned or operated by the customer of the IaaS provider. The data plane mirror app tier 640 may be configured to make calls to the data plane VCN 618 but may not be configured to make calls to any entity contained in the control plane VCN 616. The customer may desire to deploy or otherwise use resources in the data plane VCN 618 that are provisioned in the control plane VCN 616, and the data plane mirror app tier 640 can facilitate the desired deployment, or other usage of resources, of the customer.

In some embodiments, the customer of the IaaS provider can apply filters to the data plane VCN 618. In some embodiments, the customer can determine what the data plane VCN 618 can access, and the customer may restrict access to public Internet 654 from the data plane VCN 618. The IaaS provider may not be able to apply filters or otherwise control access of the data plane VCN 618 to any outside networks or databases. Applying filters and controls by the customer onto the data plane VCN 618, contained in the customer tenancy 621, can help isolate the data plane VCN 618 from other customers and from public Internet 654.

In some embodiments, cloud services 656 can be called by the service gateway 636 to access services that may not exist on public Internet 654, on the control plane VCN 616, or on the data plane VCN 618. The connection between cloud services 656 and the control plane VCN 616 or the data plane VCN 618 may not be live or continuous. Cloud services 656 may exist on a different network owned or operated by the IaaS provider. Cloud services 656 may be configured to receive calls from the service gateway 636 and may be configured to not receive calls from public Internet 654. Some cloud services 656 may be isolated from other cloud services 656, and the control plane VCN 616 may be isolated from cloud services 656 that may not be in the same region as the control plane VCN 616. For example, the control plane VCN 616 may be located in "Region 1," and cloud service "Deployment 5," may be located in Region 1 and in "Region 2." If a call to Deployment 5 is made by the service gateway 636 contained in the control plane VCN 616 located in Region 1, the call may be transmitted to Deployment 5 in Region 1. In this example, the control plane VCN 616, or Deployment 5 in Region 1, may not be communicatively coupled to, or otherwise in communication with, Deployment 5 in Region 2.

Figure 7:
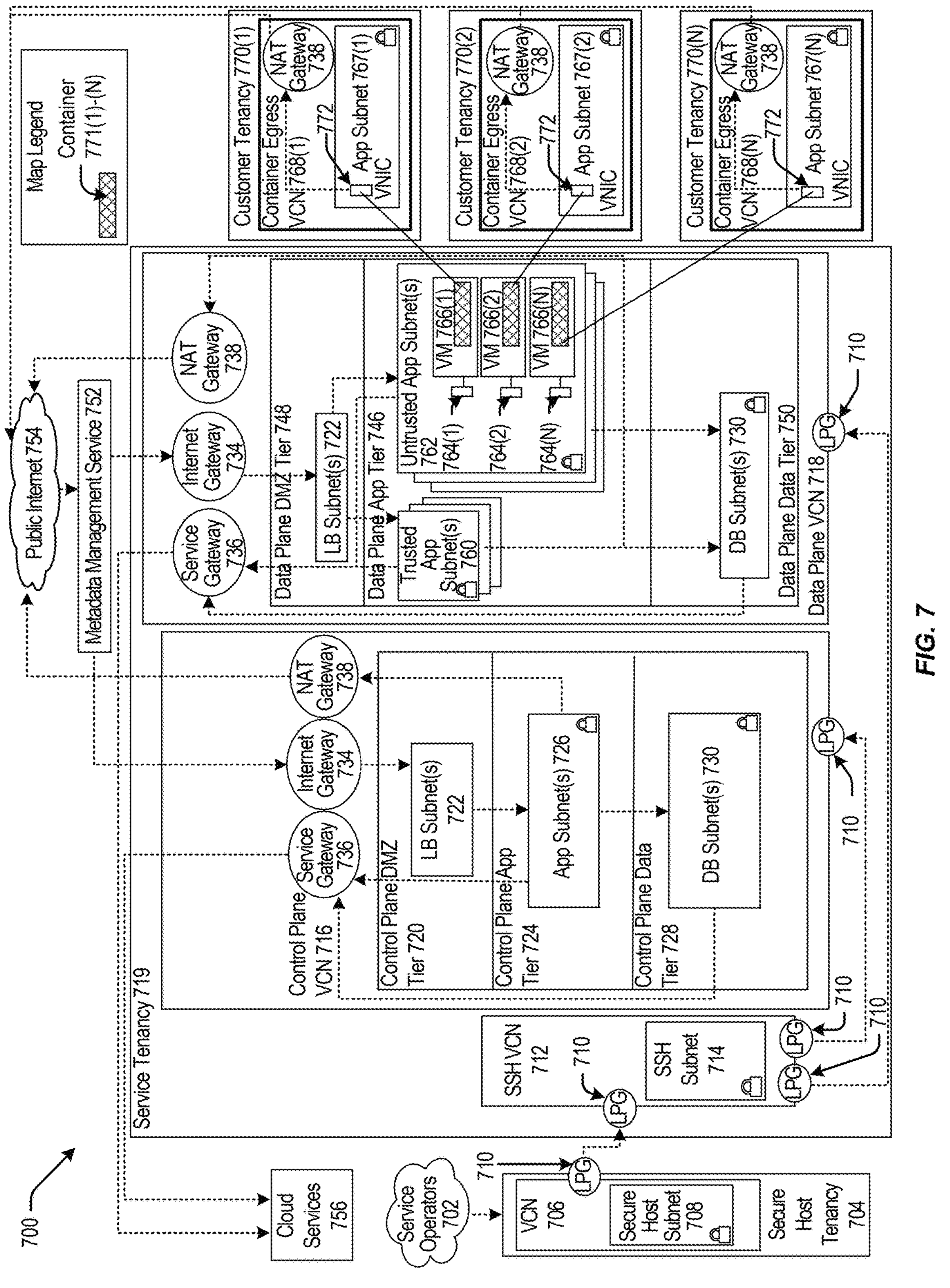
FIG. 7 is a block diagram illustrating a pattern for implementing a cloud infrastructure as a service system, according to some embodiments.

FIG. 7 is a block diagram illustrating a pattern for implementing a cloud infrastructure as a service system, according to some embodiments. Service operators 702 (e.g., service operators 502 of FIG. 5) can be communicatively coupled to a secure host tenancy 704 (e.g., the secure host tenancy 504 of FIG. 5) that can include a virtual cloud network (VCN) 706 (e.g., the VCN 506 of FIG. 5) and a secure host subnet 708 (e.g., the secure host subnet 508 of FIG. 5). The VCN 706 can include an LPG 710 (e.g., the LPG 510 of FIG. 5) that can be communicatively coupled to an SSH VCN 712 (e.g., the SSH VCN 512 of FIG. 5) via an LPG 710 contained in the SSH VCN 712. The SSH VCN 712 can include an SSH subnet 714 (e.g., the SSH subnet 514 of FIG. 5), and the SSH VCN 712 can be communicatively coupled to a control plane VCN 716 (e.g., the control plane VCN 516 of FIG. 5) via an LPG 710 contained in the control plane VCN 716 and to a data plane VCN 718 (e.g., the data plane 518 of FIG. 5) via an LPG 710 contained in the data plane VCN 718. The control plane VCN 716 and the data plane VCN 718 can be contained in a service tenancy 719 (e.g., the service tenancy 519 of FIG. 5).

The control plane VCN 716 can include a control plane DMZ tier 720 (e.g., the control plane DMZ tier 520 of FIG. 5) that can include load balancer (LB) subnet(s) 722 (e.g., LB subnet(s) 522 of FIG. 5), a control plane app tier 724 (e.g., the control plane app tier 524 of FIG. 5) that can include app subnet(s) 726 (e.g., similar to app subnet(s) 526 of FIG. 5), a control plane data tier 728 (e.g., the control plane data tier 528 of FIG. 5) that can include DB subnet(s) 730. The LB subnet(s) 722 contained in the control plane DMZ tier 720 can be communicatively coupled to the app subnet(s) 726 contained in the control plane app tier 724 and to an Internet gateway 734 (e.g., the Internet gateway 534 of FIG. 5) that can be contained in the control plane VCN 716, and the app subnet(s) 726 can be communicatively coupled to the DB subnet(s) 730 contained in the control plane data tier 728 and to a service gateway 736 (e.g., the service gateway of FIG. 5) and a network address translation (NAT) gateway 738 (e.g., the NAT gateway 538 of FIG. 5). The control plane VCN 716 can include the service gateway 736 and the NAT gateway 738.

The data plane VCN 718 can include a data plane app tier 746 (e.g., the data plane app tier 546 of FIG. 5), a data plane DMZ tier 748 (e.g., the data plane DMZ tier 548 of FIG. 5), and a data plane data tier 750 (e.g., the data plane data tier 550 of FIG. 5). The data plane DMZ tier 748 can include LB subnet(s) 722 that can be communicatively coupled to trusted app subnet(s) 760 and untrusted app subnet(s) 762 of the data plane app tier 746 and the Internet gateway 734 contained in the data plane VCN 718. The trusted app subnet(s) 760 can be communicatively coupled to the service gateway 736 contained in the data plane VCN 718, the NAT gateway 738 contained in the data plane VCN 718, and DB subnet(s) 730 contained in the data plane data tier 750. The untrusted app subnet(s) 762 can be communicatively coupled to the service gateway 736 contained in the data plane VCN 718 and DB subnet(s) 730 contained in the data plane data tier 750. The data plane data tier 750 can include DB subnet(s) 730 that can be communicatively coupled to the service gateway 736 contained in the data plane VCN 718.

The untrusted app subnet(s) 762 can include one or more primary VNICs 764(1)-(N) that can be communicatively coupled to tenant virtual machines (VMs) 766(1)-(N). Each tenant VM 766(1)-(N) can be communicatively coupled to a respective app subnet 767(1)-(N) that can be contained in respective container egress VCNs 768(1)-(N) that can be contained in respective customer tenancies 770(1)-(N). Respective secondary VNICs 772(1)-(N) can facilitate communication between the untrusted app subnet(s) 762 contained in the data plane VCN 718 and the app subnet contained in the container egress VCNs 768(1)-(N). Each container egress VCNs 768(1)-(N) can include a NAT gateway 738 that can be communicatively coupled to public Internet 754 (e.g., public Internet 554 of FIG. 5).

The Internet gateway 734 contained in the control plane VCN 716 and contained in the data plane VCN 718 can be communicatively coupled to a metadata management service 752 (e.g., the metadata management system 552 of FIG. 5) that can be communicatively coupled to public Internet 754. Public Internet 754 can be communicatively coupled to the NAT gateway 738 contained in the control plane VCN 716 and contained in the data plane VCN 718. The service gateway 736 contained in the control plane VCN 716 and contained in the data plane VCN 718 can be communicatively coupled to cloud services 756.

In some embodiments, the data plane VCN 718 can be integrated with customer tenancies 770. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 746. Code to run the function may be executed in the VMs 766(1)-(N), and the code may not be configured to run anywhere else on the data plane VCN 718. Each VM 766(1)-(N) may be connected to one customer tenancy 770. Respective containers 771(1)-(N) contained in the VMs 766(1)-(N) may be configured to run the code. In this case, there can be a dual isolation (e.g., the containers 771(1)-(N) running code, where the containers 771(1)-(N) may be contained in at least the VM 766(1)-(N) that are contained in the untrusted app subnet(s) 762), which may help prevent incorrect or otherwise undesirable code from damaging the network of the IaaS provider or from damaging a network of a different customer. The containers 771(1)-(N) may be communicatively coupled to the customer tenancy 770 and may be configured to transmit or receive data from the customer tenancy 770. The containers 771(1)-(N) may not be configured to transmit or receive data from any other entity in the data plane VCN 718. Upon completion of running the code, the IaaS provider may kill or otherwise dispose of the containers 771(1)-(N).

In some embodiments, the trusted app subnet(s) 760 may run code that may be owned or operated by the IaaS provider. In some embodiments, the trusted app subnet(s) 760 may be communicatively coupled to the DB subnet(s) 730 and be configured to execute CRUD operations in the DB subnet(s) 730. The untrusted app subnet(s) 762 may be communicatively coupled to the DB subnet(s) 730, but in some embodiments, the untrusted app subnet(s) may be configured to execute read operations in the DB subnet(s) 730. The containers 771(1)-(N) that can be contained in the VM 766(1)-(N) of each customer and that may run code from the customer may not be communicatively coupled with the DB subnet(s) 730.

In other embodiments, the control plane VCN 716 and the data plane VCN 718 may not be directly communicatively coupled. In some embodiments, there may be no direct communication between the control plane VCN 716 and the data plane VCN 718. However, communication can occur indirectly through at least one method. An LPG 710 may be established by the IaaS provider that can facilitate communication between the control plane VCN 716 and the data plane VCN 718. In another example, the control plane VCN 716 or the data plane VCN 718 can make a call to cloud services 756 via the service gateway 736. For example, a call to cloud services 756 from the control plane VCN 716 can include a request for a service that can communicate with the data plane VCN 718.

Figure 8:
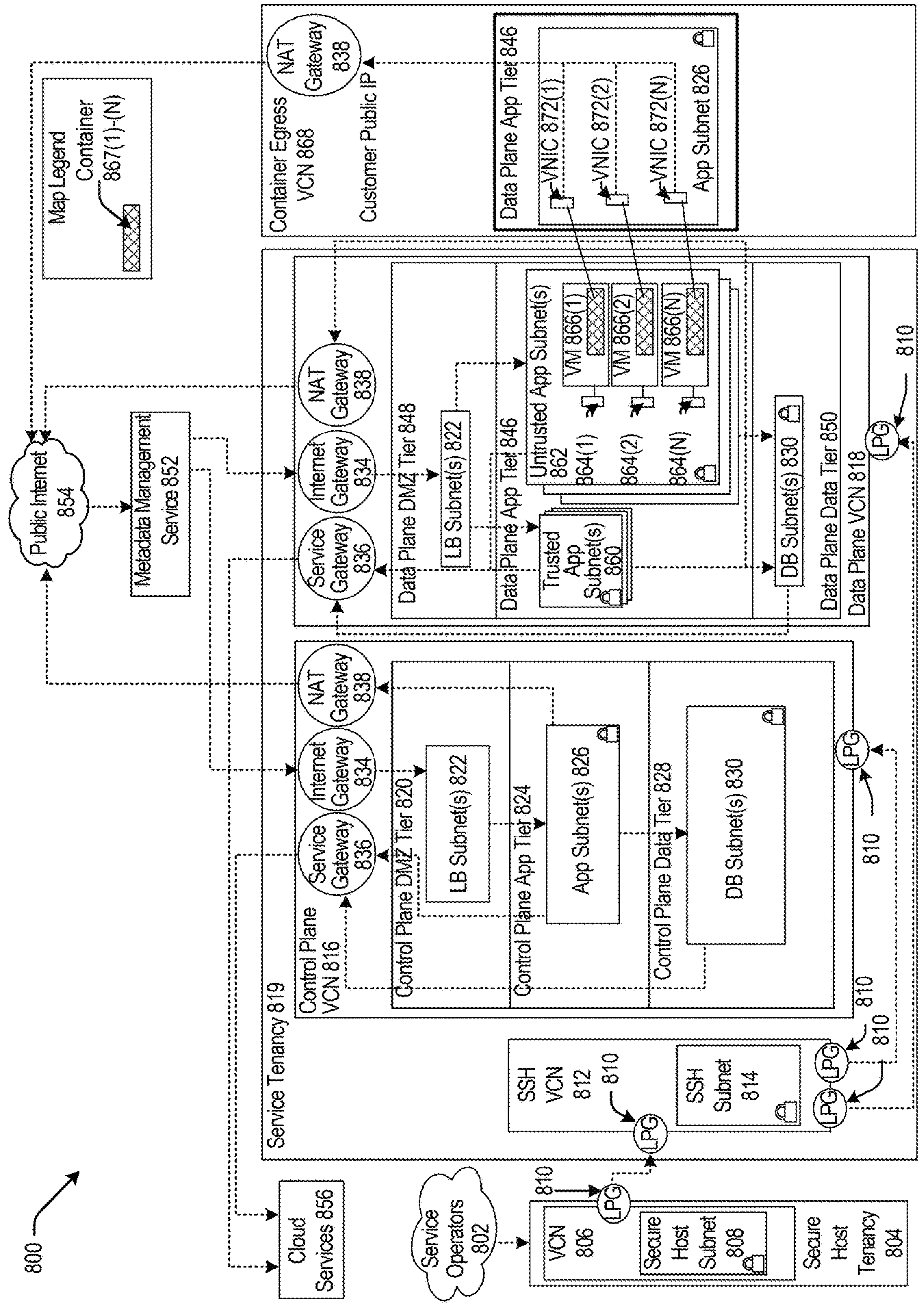
FIG. 8 is a block diagram illustrating a pattern for implementing a cloud infrastructure as a service system, according to some embodiments.

FIG. 8 is a block diagram illustrating a pattern for implementing a cloud infrastructure as a service system, according to some embodiments. Service operators 802 (e.g., service operators 502 of FIG. 5) can be communicatively coupled to a secure host tenancy 804 (e.g., the secure host tenancy 504 of FIG. 5) that can include a virtual cloud network (VCN) 806 (e.g., the VCN 506 of FIG. 5) and a secure host subnet 808 (e.g., the secure host subnet 508 of FIG. 5). The VCN 806 can include an LPG 810 (e.g., the LPG 510 of FIG. 5) that can be communicatively coupled to an SSH VCN 812 (e.g., the SSH VCN 512 of FIG. 5) via an LPG 810 contained in the SSH VCN 812. The SSH VCN 812 can include an SSH subnet 814 (e.g., the SSH subnet 514 of FIG. 5), and the SSH VCN 812 can be communicatively coupled to a control plane VCN 816 (e.g., the control plane VCN 516 of FIG. 5) via an LPG 810 contained in the control plane VCN 816 and to a data plane VCN 818 (e.g., the data plane 518 of FIG. 5) via an LPG 810 contained in the data plane VCN 818. The control plane VCN 816 and the data plane VCN 818 can be contained in a service tenancy 819 (e.g., the service tenancy 519 of FIG. 5).

The control plane VCN 816 can include a control plane DMZ tier 820 (e.g., the control plane DMZ tier 520 of FIG. 5) that can include LB subnet(s) 822 (e.g., LB subnet(s) 522 of FIG. 5), a control plane app tier 824 (e.g., the control plane app tier 524 of FIG. 5) that can include app subnet(s) 826 (e.g., app subnet(s) 526 of FIG. 5), a control plane data tier 828 (e.g., the control plane data tier 528 of FIG. 5) that can include DB subnet(s) 830 (e.g., DB subnet(s) 730 of FIG. 7). The LB subnet(s) 822 contained in the control plane DMZ tier 820 can be communicatively coupled to the app subnet(s) 826 contained in the control plane app tier 824 and to an Internet gateway 834 (e.g., the Internet gateway 534 of FIG. 5) that can be contained in the control plane VCN 816, and the app subnet(s) 826 can be communicatively coupled to the DB subnet(s) 830 contained in the control plane data tier 828 and to a service gateway 836 (e.g., the service gateway of FIG. 5) and a network address translation (NAT) gateway 838 (e.g., the NAT gateway 538 of FIG. 5). The control plane VCN 816 can include the service gateway 836 and the NAT gateway 838.

The data plane VCN 818 can include a data plane app tier 846 (e.g., the data plane app tier 546 of FIG. 5), a data plane DMZ tier 848 (e.g., the data plane DMZ tier 548 of FIG. 5), and a data plane data tier 850 (e.g., the data plane data tier 550 of FIG. 5). The data plane DMZ tier 848 can include LB subnet(s) 822 that can be communicatively coupled to trusted app subnet(s) 860 (e.g., trusted app subnet(s) 760 of FIG. 7) and untrusted app subnet(s) 862 (e.g., untrusted app subnet(s) 762 of FIG. 7) of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include primary VNICs 864(1)-(N) that can be communicatively coupled to tenant virtual machines (VMs) 866(1)-(N) residing within the untrusted app subnet(s) 862. Each tenant VM 866(1)-(N) can run code in a respective container 867(1)-(N), and be communicatively coupled to an app subnet 826 that can be contained in a data plane app tier 846 that can be contained in a container egress VCN 868. Respective secondary VNICs 872(1)-(N) can facilitate communication between the untrusted app subnet(s) 862 contained in the data plane VCN 818 and the app subnet contained in the container egress VCN 868. The container egress VCN can include a NAT gateway 838 that can be communicatively coupled to public Internet 854 (e.g., public Internet 554 of FIG. 5).

The Internet gateway 834 contained in the control plane VCN 816 and contained in the data plane VCN 818 can be communicatively coupled to a metadata management service 852 (e.g., the metadata management system 552 of FIG. 5) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively coupled to cloud services 856.

In some examples, the pattern illustrated by the architecture of block diagram 800 of FIG. 8 may be considered an exception to the pattern illustrated by the architecture of block diagram 700 of FIG. 7 and may be desirable for a customer of the IaaS provider if the IaaS provider cannot directly communicate with the customer (e.g., a disconnected region). The respective containers 867(1)-(N) that are contained in the VMs 866(1)-(N) for each customer can be accessed in real-time by the customer. The containers 867(1)-(N) may be configured to make calls to respective secondary VNICs 872(1)-(N) contained in app subnet(s) 826 of the data plane app tier 846 that can be contained in the container egress VCN 868. The secondary VNICs 872(1)-(N) can transmit the calls to the NAT gateway 838 that may transmit the calls to public Internet 854. In this example, the containers 867(1)-(N) that can be accessed in real-time by the customer can be isolated from the control plane VCN 816 and can be isolated from other entities contained in the data plane VCN 818. The containers 867(1)-(N) may also be isolated from resources from other customers.

In other examples, the customer can use the containers 867(1)-(N) to call cloud services 856. In this example, the customer may run code in the containers 867(1)-(N) that requests a service from cloud services 856. The containers 867(1)-(N) can transmit this request to the secondary VNICs 872(1)-(N) that can transmit the request to the NAT gateway that can transmit the request to public Internet 854. Public Internet 854 can transmit the request to LB subnet(s) 822 contained in the control plane VCN 816 via the Internet gateway 834. In response to determining the request is valid, the LB subnet(s) can transmit the request to app subnet(s) 826 that can transmit the request to cloud services 856 via the service gateway 836.

It should be appreciated that IaaS architectures 500, 600, 700, 800 depicted in the figures may have other components than those depicted. Further, the embodiments shown in the figures are only some examples of a cloud infrastructure system that may incorporate some embodiments of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 9:
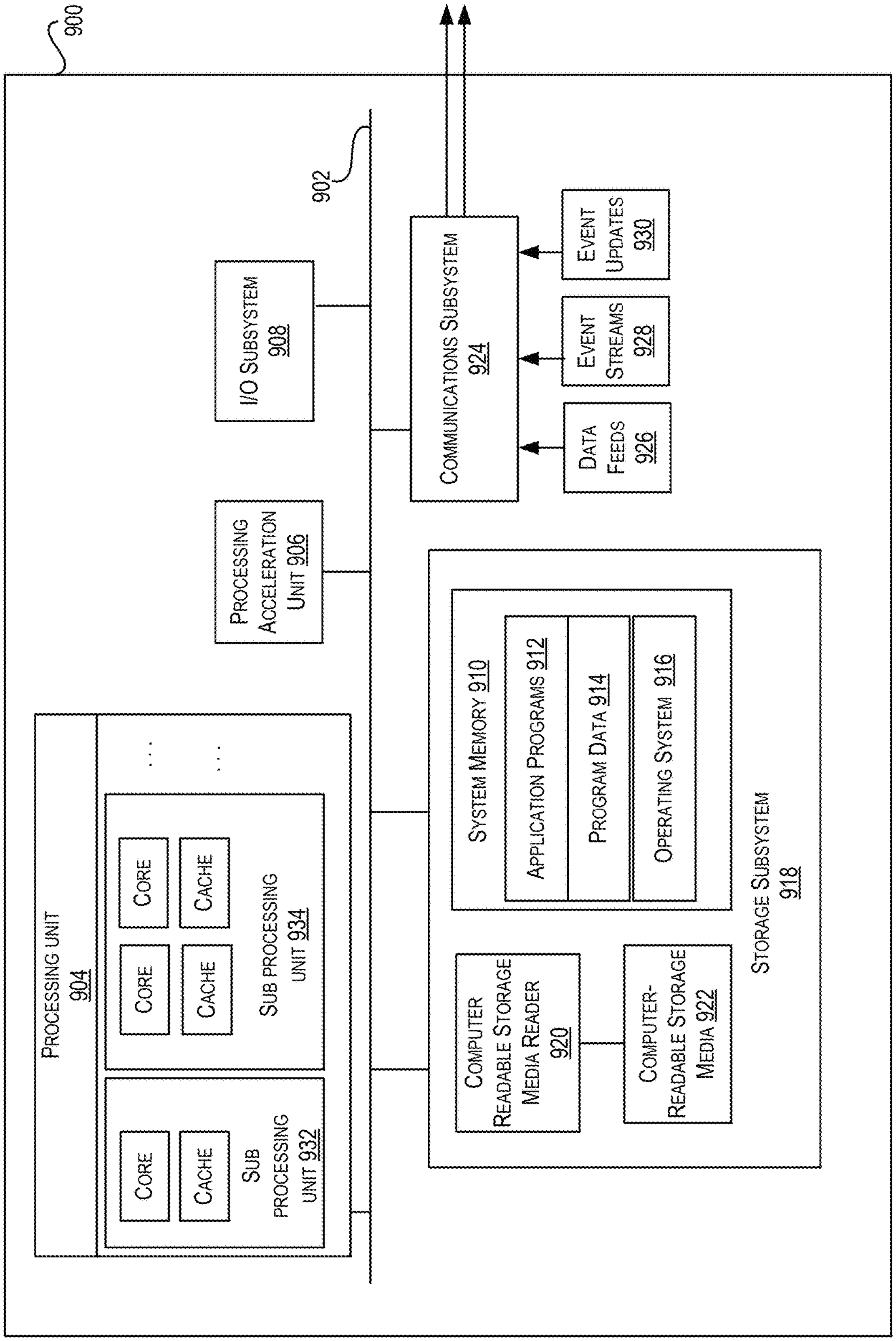
FIG. 9 is a block diagram illustrating a computer system, according to some embodiments.

FIG. 9 is a block diagram illustrating a computer system, according to some embodiments. The system 900 may be used to implement any of the computer systems described above. As shown in the figure, computer system 900 includes a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 includes tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 904, which can be implemented as one or more integrated circuits (e.g., a conventional microprocessor or microcontroller), controls the operation of computer system 900. One or more processors may be included in processing unit 904. These processors may include single core or multicore processors. In certain embodiments, processing unit 904 may be implemented as one or more independent processing units 932 and/or 934 with single or multicore processors included in each processing unit. In other embodiments, processing unit 904 may also be implemented as a quad-core processing unit formed by integrating two dual-core processors into a single chip.

In various embodiments, processing unit 904 can execute a variety of programs in response to program code and can maintain multiple concurrently executing programs or processes. At any given time, some or all of the program code to be executed can be resident in processor(s) 904 and/or in storage subsystem 918. Through suitable programming, processor(s) 904 can provide various functionalities described above. Computer system 900 may additionally include a processing acceleration unit 906, which can include a digital signal processor (DSP), a special-purpose processor, and/or the like.

I/O subsystem 908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term “output device” is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 900 may comprise a storage subsystem 918 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 904 provide the functionality described above. Storage subsystem 918 may also provide a repository for storing data used in accordance with the present disclosure.

As depicted in the example in FIG. 9, storage subsystem 918 can include various components including a system memory 910, computer-readable storage media 922, and a computer readable storage media reader 920. System memory 910 may store program instructions that are loadable and executable by processing unit 904. System memory 910 may also store data that is used during the execution of the instructions and/or data that is generated during the execution of the program instructions. Various different kinds of programs may be loaded into system memory 910 including but not limited to client applications, Web browsers, mid-tier applications, relational database management systems (RDBMS), virtual machines, containers, etc.

System memory 910 may also store an operating system 916. Examples of operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 900 executes one or more virtual machines, the virtual machines along with their guest operating systems (GOSs) may be loaded into system memory 910 and executed by one or more processors or cores of processing unit 904.

System memory 910 can come in different configurations depending upon the type of computer system 900. For example, system memory 910 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 910 may include a basic input/output system (BIOS) containing basic routines that help to transfer information between elements within computer system 900, such as during start-up.

Computer-readable storage media 922 may represent remote, local, fixed, and/or removable storage devices plus storage media for temporarily and/or more permanently containing, storing, computer-readable information for use by computer system 900 including instructions executable by processing unit 904 of computer system 900.

Computer-readable storage media 922 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 922 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 900.

Machine-readable instructions executable by one or more processors or cores of processing unit 904 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 924 provides an interface to other computer systems and networks. Communications subsystem 924 serves as an interface for receiving data from and transmitting data to other systems from computer system 900. For example, communications subsystem 924 may enable computer system 900 to connect to one or more devices via the Internet. In some embodiments communications subsystem 924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof)), global positioning system (GPS) receiver components, and/or other components. In some embodiments communications subsystem 924 can provide wired network connectivity (e.g., Ethernet) in addition to or instead of a wireless interface.

In some embodiments, communications subsystem 924 may also receive input communication in the form of structured and/or unstructured data feeds 926, event streams 928, event updates 930, and the like on behalf of one or more users who may use computer system 900.

By way of example, communications subsystem 924 may be configured to receive data feeds 926 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 924 may also be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including, but not limited to, conventional techniques for inter-process communication, and different pairs of processes may use different techniques, or the same pair of processes may use different techniques at different times.

The specifications and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specifications and drawings are, accordingly, to be regarded as illustrative rather than restrictive.

What is claimed is:

1. A method comprising:

receiving, by a computer system, an authorization request from a user device;

generating, by the computer system, a cache key for the authorization request;

determining, by the computer system, whether authorization data, stored in a cache of the computer system, complies with a timing threshold; and in accordance with a determination that the authorization data stored in the cache does not comply with the timing threshold, requesting, by the computer system, updated authorization data corresponding to the authorization data that does not comply with the timing threshold by:

determining, by the computer system, a timing for the request for retrieving the updated authorization data from a metadata store;

implementing, by the computer system, a lock configured to use the cache key, wherein for a given cache, one refresh is triggered for the cache key in accordance with multiple authorization requests being attempted to acquire a value of the given cache using the cache key, and wherein the lock is configured to block subsequent requests for the updated authorization data from making duplicate requests for the cache key;

executing, by the computer system, the request for the updated authorization data according to the timing;

storing, by the computer system, the updated authorization data in the cache; and generating, by the computer system, an authorization response.

2. The method of claim 1, wherein the authorization request is for accessing data associated with a user device.

3. The method of claim 1, further comprising:

approving, by the computer system, access to requested data according to the updated authorization data.

4. The method of claim 1, further comprising:

denying, by the computer system, access to requested data according to the updated authorization data.

5. The method of claim 1, further comprising:

determining, by the computer system, whether the authorization data stored in the cache complies with a second timing threshold; and wherein determining the timing for the request for retrieving the updated authorization data from the metadata store comprises, in accordance with the determination that the authorization data stored in the cache does comply with the second timing threshold, determining that the timing for the request is after the authorization response has been generated.

6. The method of claim 1, further comprising:

determining, by the computer system, that an authorization service is down.

7. The method of claim 1, further comprising:

determining, by the computer system, whether authorization data, stored in the cache of the computer system, complies with a second timing threshold; and wherein determining the timing for the request for retrieving the updated authorization from the metadata store comprises, in accordance with a determination that the authorization data stored in the cache does not comply with the second timing threshold determining that the timing for the request is before an authorization response has been generated.

8. The method of claim 7, further comprising: wherein determining the timing for the request for retrieving the updated authorization data from the metadata store comprises, in accordance with a determination that no authorization data is stored in the cache, determining that the timing for the request is before an authorization response has been generated.

9. The method of claim 1, the method further comprising:

generating, by the computer system, a hash key for the request; and tracking, by the computer system, the hash key.

10. A non-transitory computer-readable medium storing computer-executable instructions that, when executed by one or more processors of a computer system, cause the computer system to perform operations comprising:

receiving, by the computer system, an authorization request from a user device;

generating, by the computer system, a cache key for the authorization request;

determining, by the computer system, whether authorization data, stored in a cache of the computer system, complies with a timing threshold; and in accordance with a determination that the authorization data stored in the cache does not comply with the timing threshold, requesting, by the computer system, updated authorization data corresponding to the authorization data that does not comply with the timing threshold by:

determining, by the computer system, a timing for the request for retrieving the updated authorization data from a metadata store;

implementing, by the computer system, a lock configured to use the cache key, wherein for a given cache, one refresh is triggered for the cache key in accordance with multiple authorization requests being attempted to acquire a value of the given cache using the cache key, and wherein the lock is configured to block subsequent requests for the updated authorization data from making duplicate requests for the cache key;

executing, by the computer system, the request for the updated authorization data according to the timing;

storing, by the computer system, the updated authorization data in the cache; and generating, by the computer system, an authorization response.

11. The non-transitory computer-readable medium of claim 10, the operations further comprising:

determining, by the computer system, whether the authorization data stored in the cache complies with a second timing threshold; and wherein determining the timing for the request for retrieving the updated authorization data from the metadata store comprises, in accordance with the determination that the authorization data stored in the cache does not comply with the second timing threshold, determining that the timing for the request is before an authorization response has been generated.

12. The non-transitory computer-readable medium of claim 11, the operations further comprising:

wherein determining the timing for the request for retrieving the updated authorization data from the metadata store comprises, in accordance with a determination that no authorization data is stored in the cache, determining that the timing for the request is before an authorization response has been generated.

13. The non-transitory computer-readable medium of claim 10, the operations further comprising:

generating, by the computer system, a hash key for the request; and tracking, by the computer system, the hash key.

14. A computer system, comprising:

one or more memories configured to store computer-executable instructions; and one or more processors configured to access the one or more memories and execute the computer-executable instructions to at least:

receive, by the computer system, an authorization request from a user device;

generating, by the computer system, a cache key for the authorization request;

determine, by the computer system, whether authorization data, stored in a cache of the computer system, complies with a timing threshold; and in accordance with a determination that the authorization data stored in the cache does not comply with the timing threshold, request, by the computer system, updated authorization data corresponding to the authorization data that does not comply with the timing threshold by:

determining, by the computer system, a timing for the request for retrieving the updated authorization data from a metadata store;

implementing, by the computer system, a lock configured to use the cache key, wherein for a given cache, one refresh is triggered for the cache key in accordance with multiple authorization requests being attempted to acquire a value of the given cache using the cache key, and wherein the lock is configured to block subsequent requests for the updated authorization data from making duplicate requests for the cache key;

executing, by the computer system, the request for the updated authorization data according to the timing;

storing, by the computer system, the updated authorization data in the cache; and generating, by the computer system, an authorization response.

15. The computer system of claim 14, wherein the one or more processors are configured to further execute the computer-executable instructions to at least:

determine, by the computer system, whether authorization data, stored in the cache of the computer system, complies with a second timing threshold; and wherein determining the timing for the request for retrieving the updated authorization from the metadata store comprises, in accordance with a determination that the authorization data stored in the cache does not comply with the second timing threshold, determining that the timing for the request is before an authorization response has been generated.

16. The computer system of claim 15, wherein the one or more processors are configured to further execute the computer-executable instructions to at least:

wherein determining the timing for the request for retrieving the updated authorization data from the metadata store comprises, in accordance with a determination that no authorization data is stored in the cache, determining that the timing for the request is before an authorization response has been generated.

* * * * *